(12) United States Patent
Yonezu et al.

(10) Patent No.: US 11,219,829 B2
(45) Date of Patent: Jan. 11, 2022

(54) NON-TRANSITORY COMPUTER-READABLE STORAGE MEDIUM STORING IMAGE PROCESSING PROGRAM, IMAGE PROCESSING SYSTEM, IMAGE PROCESSING APPARATUS, AND IMAGE PROCESSING METHOD

(71) Applicant: Nintendo Co., Ltd., Kyoto (JP)

(72) Inventors: Makoto Yonezu, Kyoto (JP); Koji Takahashi, Kyoto (JP); Jun Takamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/682,049

(22) Filed: Nov. 13, 2019

(65) Prior Publication Data
US 2020/0298117 A1 Sep. 24, 2020

(30) Foreign Application Priority Data
Mar. 22, 2019 (JP) .............................. JP2019-054189

(51) Int. Cl.
*G06T 15/20* (2011.01)
*G06T 15/50* (2011.01)
(Continued)

(52) U.S. Cl.
CPC .......... *A63F 13/56* (2014.09); *A63F 13/5252* (2014.09); *G06T 15/20* (2013.01);
(Continued)

(58) Field of Classification Search
CPC .... A63F 13/525; A63F 13/5252; A63F 13/56; A63F 13/57; A63F 13/577; G06T 13/40;
(Continued)

(56) References Cited

U.S. PATENT DOCUMENTS 8,031,193 B1* 10/2011 Henderson .............. G06T 15/80
345/426
2006/0258444 A1* 11/2006 Nogami .................. A63F 13/10
463/30

(Continued)

FOREIGN PATENT DOCUMENTS

JP 2006-314633 11/2006
JP 2006-318389 A 11/2006
(Continued)

OTHER PUBLICATIONS

Stappers (NPL "Experiencing non-Newtonian physics in Virtual Reality") Citation: Stappers, "Experiencing non-Newtonian physics in Virtual Reality", Delft University of Technology, 1997 (Year: 1997).*

(Continued)

*Primary Examiner* — Diane M Wills
(74) *Attorney, Agent, or Firm* — Nixon & Vanderhye P.C.

(57) ABSTRACT

An example image processing apparatus disposes a virtual camera and a terrain object in a virtual space, and generates grass objects at a predetermined region located with reference to a land horizon that is a boundary between the terrain object and a background as viewed from the virtual camera.

(Continued)

A player character is displayed at a position closer to the virtual camera, and the grass objects are generated in the predetermined region located with reference to the land horizon. Therefore, the terrain can be represented to look real, and the player character can be more easily seen.

29 Claims, 9 Drawing Sheets

(51) Int. Cl.
- *G06T 15/80* (2011.01)
- *G06T 19/00* (2011.01)
- *A63F 13/56* (2014.01)
- *A63F 13/5252* (2014.01)

(52) U.S. Cl.
CPC ............ *G06T 15/503* (2013.01); *G06T 15/80* (2013.01); *G06T 19/003* (2013.01)

(58) Field of Classification Search
CPC ....... G06T 15/20; G06T 15/503; G06T 15/80; G06T 19/003; G06T 19/20; G06T 2219/2016
See application file for complete search history.

(56) References Cited

U.S. PATENT DOCUMENTS

| | | | |
|---|---|---|---|
| 2013/0210524 A1* | 8/2013 | Otani | A63F 13/10 463/33 |
| 2016/0307369 A1* | 10/2016 | Freedman | G06T 15/005 |
| 2017/0294047 A1* | 10/2017 | Asakura | A63F 13/5258 |
| 2018/0365905 A1* | 12/2018 | Lane | A63F 13/355 |
| 2019/0034056 A1* | 1/2019 | Eisenmann | G06F 3/04815 |
| 2019/0070505 A1* | 3/2019 | Ratelle | A63F 13/57 |

FOREIGN PATENT DOCUMENTS

| | | |
|---|---|---|
| JP | 2009-129167 A | 6/2009 |
| JP | 2013-168022 A | 8/2013 |
| JP | 2017-188002 A | 10/2017 |

OTHER PUBLICATIONS

Youtube Video titled "[Ludum Dare #30] This Little Piggy: Behind the Scenes", URL https://www.youtube.com/watch?v=H7-3dZTERf0, 2014. (Year: 2014).*

English translation of Office Action issued in Japanese Applicaiton No. 2019-054189 dated Nov. 8, 2021(5 pages).

* cited by examiner

NON-TRANSITORY COMPUTER-READABLE STORAGE MEDIUM STORING IMAGE PROCESSING PROGRAM, IMAGE PROCESSING SYSTEM, IMAGE PROCESSING APPARATUS, AND IMAGE PROCESSING METHOD

CROSS REFERENCE TO RELATED APPLICATION

The disclosure of Japanese Patent Application No. 2019-54189, filed Mar. 22, 2019, is incorporated herein by reference.

FIELD

The present disclosure relates to image processing programs, image processing systems, image processing apparatuses, and image processing methods that are capable of generating an image.

BACKGROUND AND SUMMARY

There is a game apparatus that disposes a player character in a virtual terrain, and operates the player character on the terrain.

However, there is room for improvement of representation of a terrain while ensuring that the representation is easy to see.

With this in mind, it is an object of this embodiment to provide an image processing program, image processing system, image processing apparatus, and image processing method that are capable of providing improved representation of a terrain while ensuring that the representation is easy to see.

To achieve the above, this non-limiting example embodiment has the following features.

An image processing program of this embodiment causes a computer of an information processing apparatus to control a virtual camera in a virtual space, and dispose a terrain object in the virtual space. The image processing program also causes the computer to execute generating an object in a range located with reference to a boundary line between the terrain object and a background as viewed from the virtual camera, on the terrain object. The image processing program also causes the computer to execute generating an image of the virtual space, based on the virtual camera, the image being to be displayed on a display device.

Accordingly, an object is generated in a range located with reference to a boundary line between a terrain object and a background as viewed from a virtual camera. As a result, for example, representation of the terrain in the range located with reference to the boundary line can be improved, and a region closer to the virtual camera than the range is can be more easily seen.

The terrain object may be in the shape of at least a portion of the side surface of a cylinder or at least a portion of a spherical surface.

Accordingly, the terrain object is the side surface of a cylinder or a spherical surface, and therefore, a boundary between the terrain object and the background as viewed from the virtual camera can be more easily identified.

The image processing program may cause the computer to further execute deforming at least a range of a flat terrain corresponding a field of view of the virtual camera, to generate the terrain object having a curved surface shape.

Accordingly, a curved terrain object can be formed by deforming a flat terrain. Therefore, it is not necessary to previously prepare a curved terrain object, resulting in an improvement in development efficiency.

The boundary line may be determined based on a positional relationship between the virtual camera and the terrain object.

Accordingly, the boundary line is determined between a positional relationship between the virtual camera and the terrain object. Therefore, for example, when the virtual camera moves relative to the terrain object, the boundary line also moves, and the object can be dynamically generated.

The boundary line may be determined based on a point of tangency of a tangent line from the virtual camera to the curved surface.

Accordingly, a line determined based on a point of tangency of a tangent line from the virtual camera to the curved surface can be set as a boundary line. Therefore, a boundary line between the terrain object and the background can be determined.

The computer may include a graphics processor having a vertex shader function, and the deformation of the terrain and the generation of the object may be performed by coordinate conversion using the vertex shader function.

Accordingly, vertices of each object are displaced by the graphics processor using the vertex shader function, resulting in a higher-speed process.

The object may include a grass object. The image processing program may also cause the computer to generate, on a portion of the terrain object on which generation of the grass object is allowed, the grass object by coordinate conversion of a vertex of the grass object so that the grass object, when located closer to the virtual camera in the range, has a shorter length.

Accordingly, for example, a scene that grass grows on the terrain object can be represented.

The object may include a snow object. The image processing program may also cause the computer to generate, on a portion of the terrain object on which generation of the snow object is allowed, the snow object by coordinate conversion of a vertex of the snow object so that the snow object, when located closer to the virtual camera in the range, has a shorter length.

Accordingly, for example, a scene that snow lies on the terrain object can be represented.

The object may have a height, and the object may be generated so that the height of the object varies depending on a distance thereof from the virtual camera.

Accordingly, a height of the object can be decreased with a decrease in distance to the virtual camera. Conversely, the height of the object can be increased with a decrease in distance to the boundary line. As a result, a region close to the virtual camera can be more easily seen, and representation of a region close to the boundary line can be improved.

The image processing program may cause the computer to further execute moving a player character on the terrain object according to an operation input. A position of the virtual camera may be controlled based on a position of the player character so that the player character is located in front of the virtual camera in a line-of-sight direction of the virtual camera, and the boundary line is located further from the virtual camera than the player character is in the line-of-sight direction of the virtual camera.

Accordingly, the player character is located in front of the virtual camera, and the boundary line is located further from the virtual camera than the player character is, and the object is generated in a region located with reference to the boundary line. Therefore, the player character in front of the virtual camera can be more easily seen, and representation of the region located further from the virtual camera than the player character is can be improved.

The image processing program may cause the computer to further execute disposing an item object on the terrain object, and causing the player character to perform an action on the item object, according to the operation input.

Accordingly, the player character is located in front of the virtual camera, and performs an action. A boundary line is located further from the virtual camera than the player character is, and the object is generated in a region located with reference to the boundary line. Therefore, an action performed by the player character in front of the virtual camera can be more easily seen, and representation of the region located further from the virtual camera than the player character is can be improved.

The image processing program may cause the computer to further execute moving a player character on the terrain object that is flat, in the virtual space, according to an operation input, and controlling a position of the virtual camera based on a position of the player character. The image processing program may cause the computer to further execute generating the object at a position corresponding to the range on the flat terrain object based on the position of the virtual camera, and displacing vertices of the terrain object, the object, and the player character that are included in at least a field of view of the virtual camera so that the flat terrain object is deformed into a curved surface.

Accordingly, the player character can be moved on the flat terrain object, and the object can be generated in a range on the flat terrain object, and thereafter, vertices of the flat terrain object, the object, and the player character can be displaced so that the flat terrain object is deformed into a curved surface.

In other embodiments, an image processing apparatus and image processing system for executing the above process may be provided, and an image processing method to be executed by the image processing system may be provided.

According to this embodiment, representation of a terrain in a range with reference to a boundary line can be improved, and a region closer to a virtual camera than the region is can be more easily seen.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

System Configuration

Figure 1:
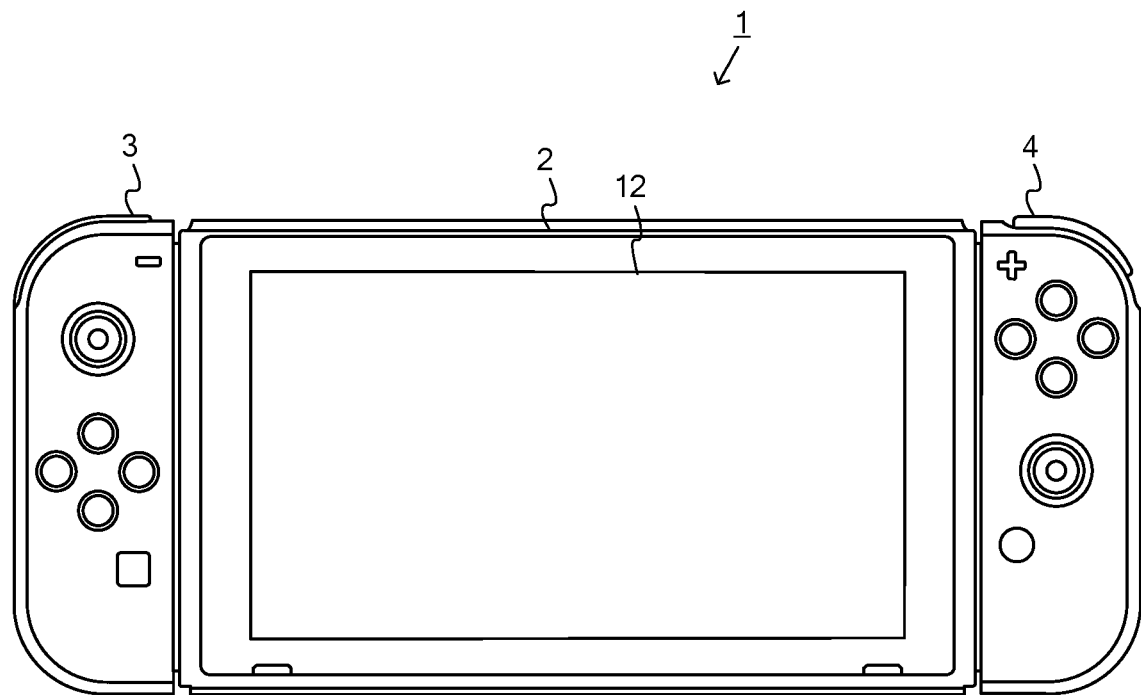
FIG. 1 is a non-limiting example game system 1 in this embodiment.

A game system 1 (non-limiting example image processing system) according to this embodiment will now be described with reference to the accompanying drawings. FIG. 1 is a diagram showing a non-limiting example of the game system 1 of this embodiment. As shown in FIG. 1, the game system 1 includes a body apparatus (non-limiting example image processing apparatus) 2 as a game apparatus, a left controller 3, and a right controller 4. The body apparatus 2 includes a display 12. Note that the left controller 3 and the right controller 4 may be removable from the body apparatus 2.

The left controller 3 is controlled using the user's left hand, and the right controller 4 is controlled using the user's right hand. The left controller 3 and the right controller 4 include a plurality of operation buttons, and an analog stick as a direction input unit.

Figure 2:
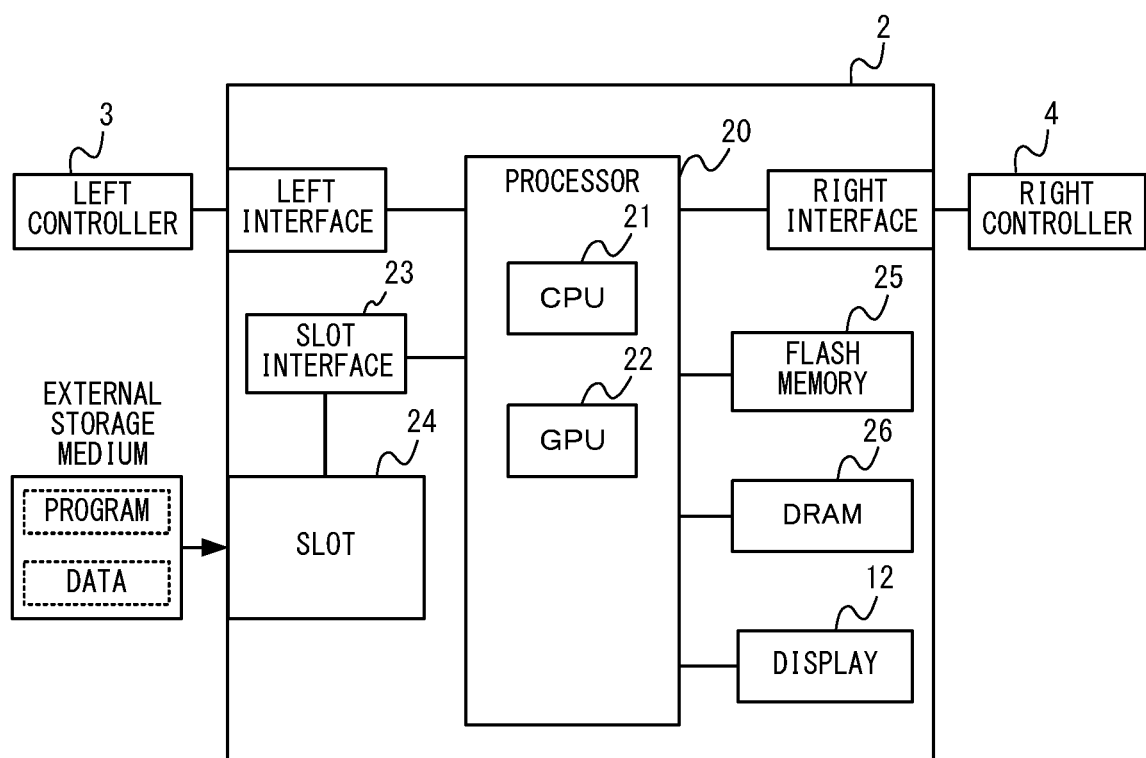
FIG. 2 is a block diagram showing a non-limiting example internal configuration of the game system 1.

FIG. 2 is a block diagram showing a non-limiting example internal configuration of the game system 1. As shown in FIG. 2, the body apparatus 2 includes a processor 20, a slot interface 23, a slot 24, a flash memory 25, and a DRAM 26. The processor 20 includes a central processing unit (CPU) 21 and a graphics processing unit (GPU) 22. The CPU 21 can execute a game program to process operation data from the controllers 3 and 4, execute a game process based on the operation data, and transmit an instruction to the GPU 22 to generate an image. The GPU 22 is a processor for performing image processing. The GPU 22 has a vertex shader function for converting coordinates of vertices of a virtual object. Note that the CPU 21 and the GPU 22 may be mounted on separate chips or may be mounted on a single chip as a system-on-a-chip (SoC).

The processor 20 is coupled to the slot interface 23, the flash memory 25, the DRAM 26, and the display 12. The processor 20 is also coupled through a left interface to the left controller 3, and through a right interface to the right controller 4. An external storage medium is removably inserted into the slot 24. The external storage medium stores a program (a game program described below) and data (a flat ground object, etc., described below). Note that the program and data may be previously stored in the flash memory 25, or may be downloaded and stored into the flash memory 25 through a network (e.g., the Internet).

The program and data stored in the external storage medium (or the flash memory 25) are loaded to the DRAM 26 during the start of a game described below. The CPU 21 executes the program to perform a game process described below. The CPU 21 also transmits an instruction to the GPU 22 to display an image on the display 12, and the GPU 22 renders an image according to the instruction, and causes the display 12 to display the image. Note that the body apparatus 2 may be coupled to an external display apparatus different from the display 12, and an image generated by the GPU 22 may be displayed on the external display apparatus.

Overview of Game and Image Processing of This Embodiment

Figure 3:
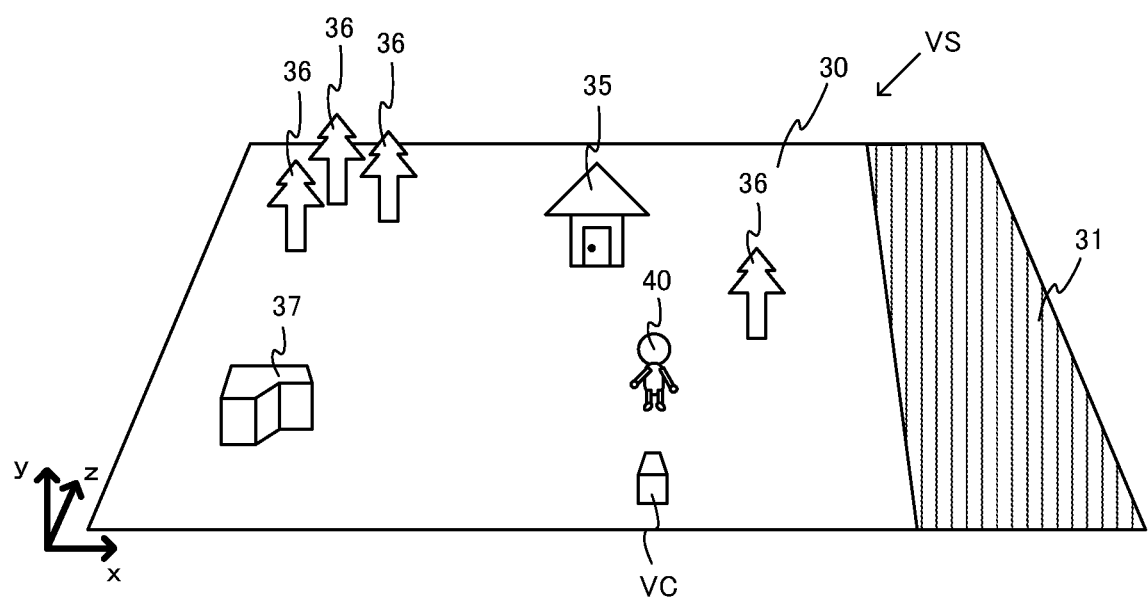
FIG. 3 is a diagram showing a non-limiting example virtual space in which a game of this embodiment is played.

Next, a game of this embodiment will be outlined. FIG. 3 is a diagram showing a non-limiting example virtual space in which the game of this embodiment is played. When the game program of this embodiment is executed, a virtual space is defined in the body apparatus 2, and various virtual objects are disposed in the virtual space. A user (player) moves a player character 40 in the virtual space using the left controller 3 and the right controller 4, so that the game proceeds.

As shown in FIG. 3, an xyz orthogonal coordinate system is set in the virtual space. The x-axis is a lateral direction axis of the virtual space, the z-axis is a depth direction axis of the virtual space, and the y-axis is a height direction axis of the virtual space. In the virtual space, as virtual objects, a ground object 30 and a river object 31 are disposed. The ground object 30 is a flat object, e.g. a surface parallel to the xz plane. Note that the ground object 30 may be a substantially flat surface that has irregularities or unevenness (a generally flat surface), or may be an exactly flat surface that does not have irregularities or unevenness. The ground object 30 and the river object 33 are terrain objects representing the terrain in the virtual space.

In addition, a house object 35, a tree object 36, and a cliff object 37 are disposed as virtual objects on the ground object 30 in the virtual space. The cliff object 37 is also a terrain object that represents a terrain in the virtual space. The player character 40 is disposed on a terrain object. A virtual camera VC is disposed behind the player character 40.

In a game of this embodiment, the user operates a controller (the left controller 3 or the right controller 4) to cause the player character 40 to move on the ground object 30 and perform a predetermined motion, so that the game proceeds. The virtual camera VC is located at a predetermined position behind the player character 40, and is moved, depending on the movement of the player character 40. The display 12 displays an image of the virtual space as viewed from the virtual camera VC.

Figure 4:
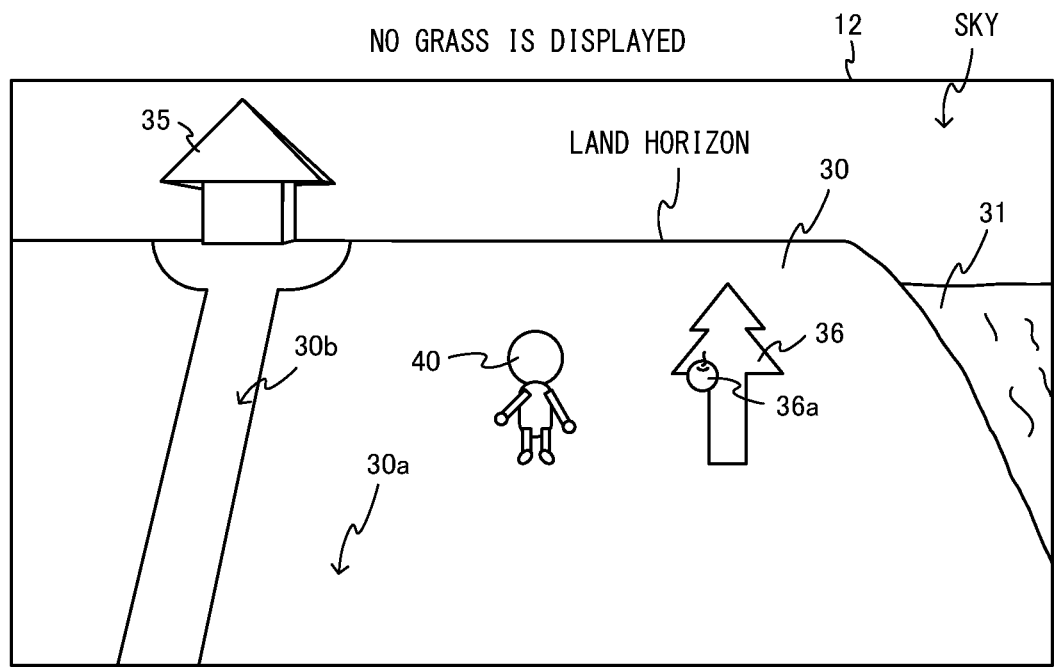
FIG. 4 is a diagram showing a non-limiting example image that is displayed on a display 12 when the game of this embodiment is being executed, where no grass objects are shown.
Figure 5:
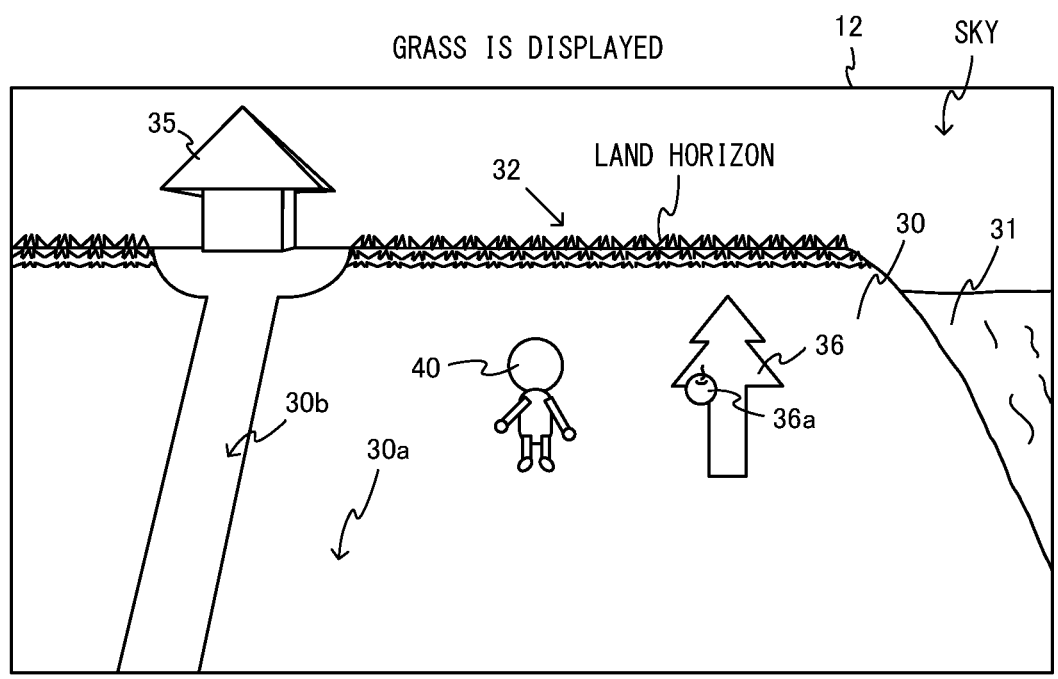
FIG. 5 is a diagram showing a non-limiting example image that is displayed on the display 12 when the game of this embodiment is being executed, where grass objects 32 are displayed.

FIG. 4 is a diagram showing a non-limiting example image that is displayed on the display 12 when the game of this embodiment is being executed, where no grass objects are shown. FIG. 5 is a diagram showing a non-limiting example image that is displayed on the display 12 when the game of this embodiment is being executed, where grass objects 32 are displayed.

As shown in FIG. 4, an image containing the ground object 30, the river object 31, the house object 35, the tree object 36, and the player character 40 is displayed, on the display 12, as a non-limiting example game image of the virtual space as viewed from the virtual camera VC. In this embodiment, as described below, the flat ground object 30 is bent into a drum shape during image generation, and an image containing the ground object 30, bent into a drum shape, is displayed on the display 12. In a game image, a boundary line between the ground object 30 and the background is displayed as a land horizon. The ground object 30 is divided into a plurality of objects such as a grassland object 30a and a road object 30b. The grassland object 30a has a green color representing the presence of grass. The road object 30b represents an earth region that is not covered with grass, and has a brown color.

The user causes the player character 40 to move the player character 40 on the ground object 30 and perform a predetermined action. For example, the user moves the player character 40 to the position of the tree object 36, and causes the player character 40 to perform a predetermined motion (e.g., a motion of swaying the tree object 36). As a result, a fruit 36a of the tree object 36 drops on the ground object 30, and the player character 40 acquires the fruit 36a. Thus, in this embodiment, the player character 40 is moved, or the player character 40 is caused to perform a predetermined action (e.g., a motion of picking up the fruit 36a) on an item object, so that the game proceeds.

Although no grass objects 32 are shown in FIG. 4, grass objects 32 are displayed in the game of this embodiment as shown FIG. 5.

Specifically, as shown in FIG. 5, grass objects 32 are generated and displayed on and near the land horizon as viewed from the virtual camera VC. The grass object 32 is, for example, a triangular, green object. Two vertices included in the base of the grass object 32 are disposed so as to share the same positions as those of vertices of the ground object 30, and the remaining vertex (peak vertex) of the grass object 32 is located at a higher position than that of the ground object 30. Grass objects 32 are generated in a predetermined region (also hereinafter referred to as a "grass generation region") located with reference to the land horizon. Specifically, grass objects 32 are generated in a grass generation region including a region that includes the land horizon and is closer to the virtual camera VC than the land horizon is, and a region that is further from the virtual camera VC than the land horizon is in the line-of-sight direction of the virtual camera VC.

Grass objects 32 are dynamically generated in a grass generation region located with reference to the land horizon. For example, when the player character 40 moves on the ground object 30 according to the user's operation, the virtual camera VC also moves, following the player character 40. In this case, the position on the ground object 30 of the land horizon as viewed from the virtual camera VC differs before and after the movement of the player character 40. For example, the house object 35 is located substantially on the land horizon in the screen shown in FIG. 5. When the player character 40 moves in the depth direction of the screen (the positive line-of-sight direction of the virtual camera VC), the position of the land horizon on the display 12 remains unchanged, and the house object 35 is moved to a position located in front of the land horizon. In other words, when the player character 40 moves in the depth direction of the screen, the position on the ground object 30 of the land horizon moves further away from the house object 35 in the depth direction, depending on the movement of the player character 40. Specifically, when the player character 40 moves in the line-of-sight direction of the virtual camera VC (the depth direction or the direction toward the virtual camera VC), the position on the ground object 30 of the land horizon also moves while the position on the display 12 of the land horizon remains unchanged. While the position of the land horizon moves, the grass generation region located with reference to the land horizon also moves.

When the player character 40 is moving on the ground object 30, grass objects 32 are dynamically generated and displayed in the grass generation region located with reference to the land horizon. When the player character 40 moves, grass objects 32 are generated in a new grass generation region located with reference to the moved land horizon. Grass objects 32 that have been generated before the movement of the player character 40 are deleted if those grass objects 32 are no longer located in the grass generation region located with reference to the moved land horizon. Specifically, when the player character 40 moves in the depth direction, the position on the ground object 30 of the land horizon moves, depending on the movement of the player character 40, and grass objects 32 are newly generated in a grass generation region located with reference to the moved land horizon. Note that grass objects 32 may be deleted by removing grass objects 32 disposed on the ground object 30. Specifically, a grass object 32 disposed on the ground object 30 may be deleted by removing the three vertices of the grass object 32. Alternatively, a grass object 32 disposed on the ground object 30 may be deleted by setting the height of the grass object 32 to "0" so that the grass object 32 is not displayed.

If the predetermined region located with reference to the land horizon is not within the region of the grassland object 30*a*, no grass objects 32 are generated in the predetermined region. Specifically, no grass objects 32 are generated in the region of the road object 30*b* on the ground object 30, in which the player character 40 is allowed to move. For example, in FIG. 5, the road object 30*b* is formed in a region around the house object 35, and no grass objects 32 are generated in the region of the road object 30*b*. In addition, even when the player character 40 moves in the direction toward the virtual camera VC in the screen of FIG. 5, no grass objects 32 are generated on the road object 30*b*.

No grass objects 32 are generated in regions of the grassland object 30*a*, in which the player character 40 is allowed to move, other than the predetermined region located with reference to the land horizon. Specifically, no grass objects 32 are generated in a region of the grassland object 30*a* that is located closer to the virtual camera VC than the predetermined region located with reference to the land horizon is. During execution of the game, when the player character 40 is moving, the virtual camera VC also moves, following the player character 40. Therefore, during execution of the game, the player character 40 is located at a predetermined position (e.g., the center of the screen) on the display 12. Because no grass objects 32 are generated in a region closer to the virtual camera VC than the predetermined region located with reference to the land horizon is, the player character 40 moves and performs a predetermined action in a region where no grass objects 32 are generated.

If the player character 40 is located in a region where grass objects 32 are generated, it may be difficult to see a necessary portion, an unnatural image may be displayed, or unnecessary calculation may be required. For example, the feet of the player character 40 may be hidden by grass objects 32 and therefore it may be difficult to see the feet, or when the player character 40 performs a predetermined action on a predetermined item (e.g., to pick up an item dropped on the ground), it may be difficult to see the predetermined item. In addition, it may look as if the feet of the player character 40 were floating above the grass object 32. In order to display a natural image, a collision between the feet of the player character 40 and grass objects 32 may be calculated, and display may be controlled based on the result of the calculation. For example, when the feet of the player character 40 strike grass objects 32, the grass objects 32 may be deformed. However, such a calculation is complicated, and if a large number of grass objects 32 are involved, a great burden is placed on the processor 20.

However, in this embodiment, grass objects 32 are generated in a predetermined region located with reference to the land horizon, and are not generated in a region where the player character 40 is located. Therefore, such a problem can be avoided.

Thus, in this embodiment, three-dimensional grass objects 32 are generated in a grass generation region located with reference to the land horizon. Therefore, grass objects 32 having a predetermined height can be displayed in a land horizon portion, and the land horizon portion can be represented so as to look real.

While no three-dimensional grass objects 32 are generated in a region of the grassland object 30*a* that is closer to the virtual camera VC than the predetermined region located with reference to the land horizon is, a green texture image imitating grass is attached to the grassland object 30*a*. The grass image on the grassland object 30*a* is not a three-dimensional virtual object, unlike the grass object 32. Therefore, although a flat image is provided in a region closer to the virtual camera VC than the grass generation region is, the angle between the direction pointing from the virtual camera VC toward the closer region, and the ground object 30, is so great that a natural image can be provided without the need of three-dimensional grass objects 32. Meanwhile, in the land horizon portion, the angle between the direction pointing from the virtual camera VC toward the land horizon, and the ground object 30, is small. Therefore, if three-dimensional grass objects 32 are not generated, the land horizon portion is flat, and a less realistic image is likely to be generated. However, in this embodiment, grass objects 32 growing in the height direction are generated in the land horizon portion, and therefore, the land horizon portion can be represented so as to look natural.

Next, a method for generating grass objects 32 will be described. In this embodiment, in the virtual space, the flat ground object 30 and other objects (32, 35-37, 40, etc.) on the ground object 30 are disposed. In the case where an image of the virtual space is generated based on the virtual camera VC, a portion of the virtual space including the ground object 30 and other objects, that is covered by at least the field of view of the virtual camera VC, is deformed into a drum shape. Firstly, a drum deformation process of deforming the virtual space into a drum shape will be described. Thereafter, the method for generating grass objects 32 will be described.

Drum Deformation Process

Figure 6:
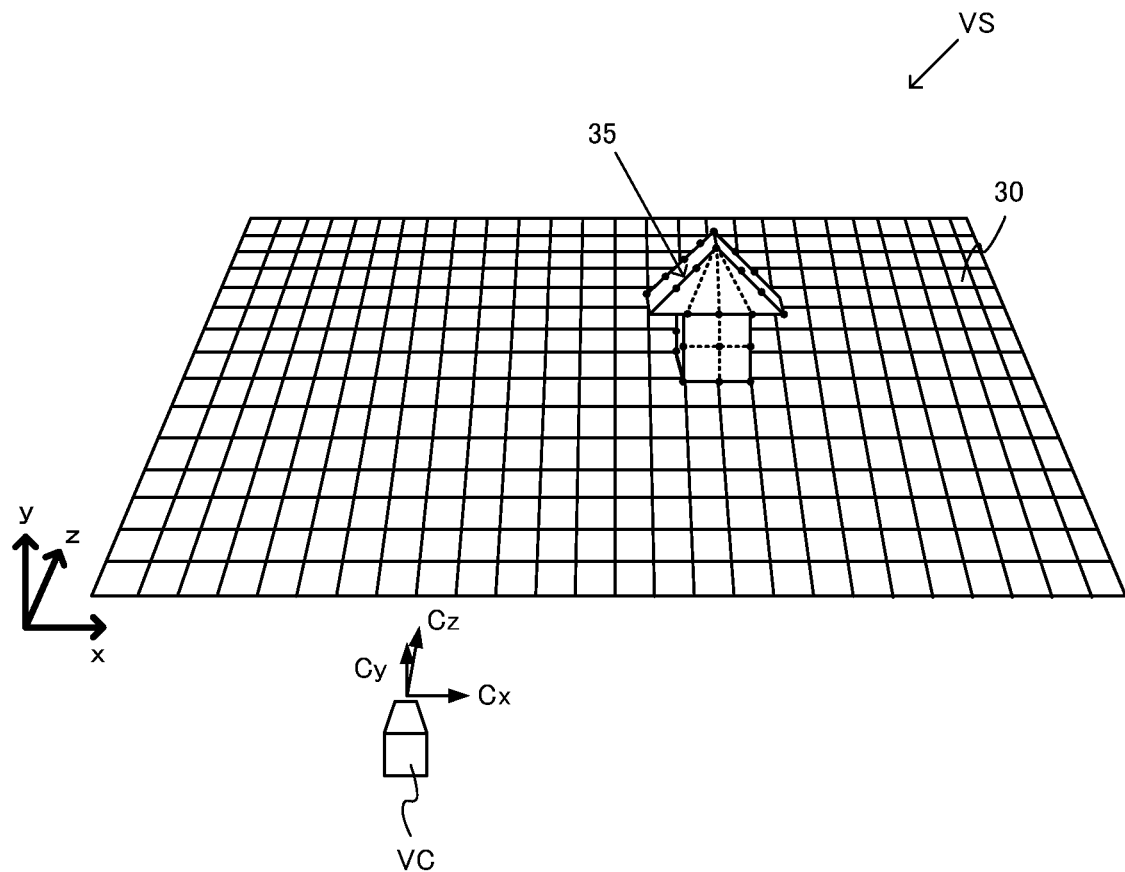
FIG. 6 is a diagram showing a non-limiting example virtual space before a drum deformation process is performed.

FIG. 6 is a diagram showing a non-limiting example virtual space before the drum deformation process is performed.

As shown in FIG. 6, in the virtual space, a ground object 30 is disposed as a terrain object, and a house object 35 is disposed on the ground object 30. Note that in FIG. 6, other objects, except for the ground object 30 and the house object 35, are not shown. In addition, a virtual camera VC is set in the virtual space. For the virtual camera VC, a CxCyCz-coordinate system fixed to the virtual camera VC is set. The Cx-axis is a lateral direction axis of the virtual camera VC. The Cy-axis is an upward direction of the virtual camera VC. The Cz-axis is a line-of-sight direction of the virtual camera VC. In this embodiment, the Cx-axis is set to be parallel to the x-axis of the virtual space. The virtual camera VC is also movable in the height direction of the virtual space. When the virtual camera VC is moved in the height direction, the virtual camera VC is turned around the Cx-axis (pitch direction). Because the Cx-axis is set to be parallel to the x-axis of the virtual space, the direction in which the line-of-sight direction of the virtual camera VC extends along the ground object 30 is parallel to the z-axis.

Figure 7:
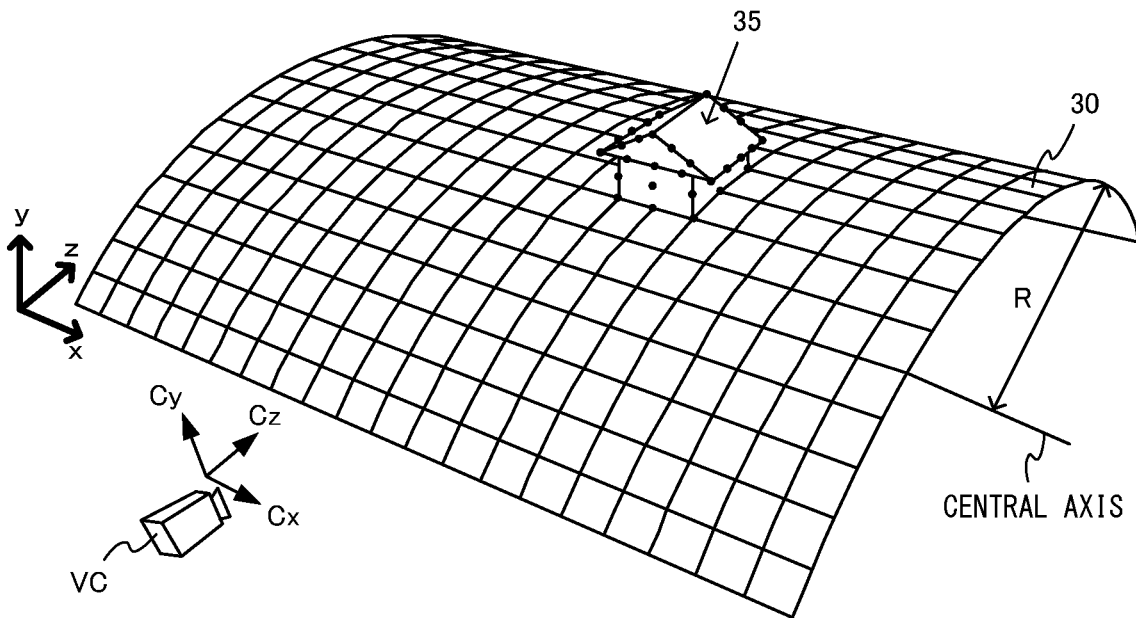
FIG. 7 is a diagram showing a non-limiting example virtual space after the drum deformation process is performed.

The drum deformation process is performed on the ground object 30 and the objects on the ground object 30 of FIG. 6. FIG. 7 is a diagram showing a non-limiting example virtual space after the drum deformation process is performed.

As shown in FIG. 7, in the drum deformation process, the entire terrain is deformed so that the ground object 30 extends along the side surface of a cylinder (drum). Specifically, the entire train is deformed so that the ground object 30 that forms the terrain is at least a portion of the side surface of a cylinder having a radius of R and a central axis parallel to the x-axis of the virtual space. Because the Cx-axis of the virtual camera VC is set to be parallel to the x-axis of the virtual space, the entire terrain is deformed so that the ground object 30 gradually becomes lower in the line-of-sight direction of the virtual camera VC (the depth direction of the screen when an image is displayed). In addition, a house object 35 (and other objects such as a tree object 36 and a player character 40) on the ground object 30 are deformed so that these objects are located along the ground object 30.

Specifically, in the drum deformation process, each of the vertices of the ground object 30 and each of the vertices of other objects disposed on the ground object 30 are subjected to coordinate conversion so that each vertex is turned around the x-axis. The drum deformation process will now be described in greater detail with reference to FIGS. 8 and 9.

Figure 8:
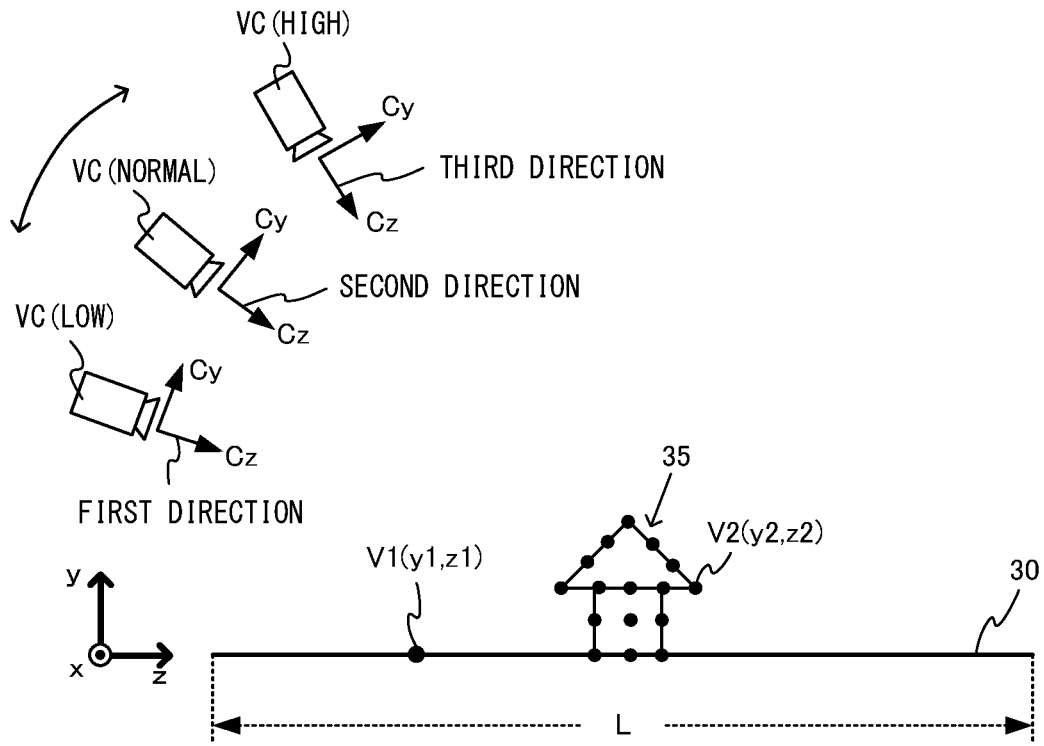
FIG. 8 is a diagram showing a non-limiting example virtual space as viewed in a direction parallel to an x-axis before the drum deformation process is performed.
Figure 9:
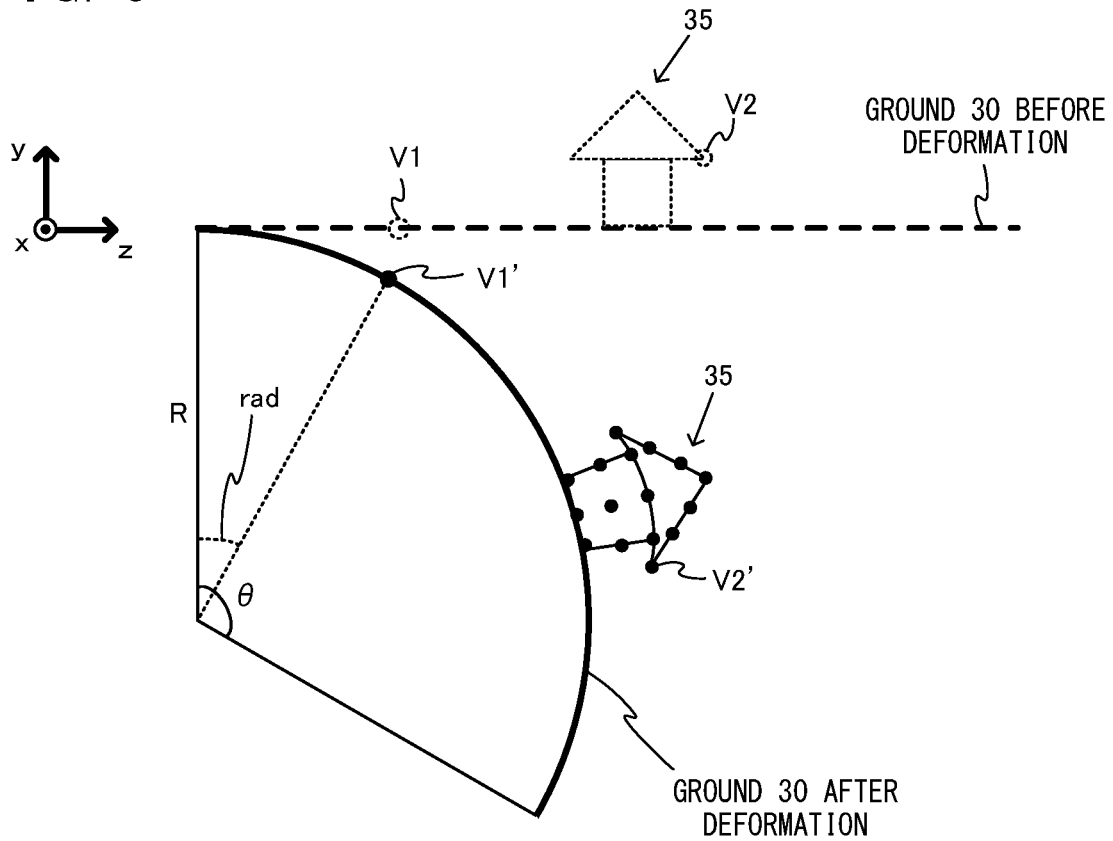
FIG. 9 is a diagram showing a non-limiting example virtual space as viewed in a direction parallel to the x-axis after the drum deformation process is performed.

FIG. 8 is a diagram showing a non-limiting example virtual space as viewed in a direction parallel to the x-axis before the drum deformation process is performed. FIG. 9 is a diagram showing a non-limiting example virtual space as viewed in a direction parallel to the x-axis after the drum deformation process is performed.

As shown in FIG. 8, it is assumed that the y-coordinate value and z-coordinate value of a vertex V1 on the ground object 30 are (y1, z1). It is also assumed that the y-coordinate value and z-coordinate value of a vertex V2 of the house object 35 are (y2, z2). It is also assumed that a predetermined distance in the z-axis direction is L. Note that L is a fixed value.

In this embodiment, the height of the virtual camera VC is changed according to the user's operation. For example, it is assumed that the position of the virtual camera VC can be set to "low," "normal," and "high." When the virtual camera VC is located at the "low" position, the line-of-sight direction of the virtual camera VC is set to a first direction, and the angle between the z-axis and the Cz-axis is set to a relatively small value (e.g., 0-20 degrees). In this case, an image of the virtual space as viewed from a side is displayed on the display 12. When the virtual camera VC is located at the "normal" position, the line-of-sight direction of the virtual camera VC is set to a second direction pointing further downward than the first direction, and the angle between the z-axis and the Cz-axis is set to a value (e.g., 45 degrees) greater than when the virtual camera VC is located at the "low" position. In this case, an image of the virtual space as viewed diagonally above is displayed. When the virtual camera VC is located at the "high" position, the line-of-sight direction of the virtual camera VC is set to a third direction pointing further downward than the second direction, and the angle between the z-axis and the Cz-axis is set to a relatively great value (e.g., 60-70 degrees). In this case, an image of the virtual space as viewed from above is displayed.

In this case, the vertices V1 and V2 of FIG. 8 are displaced to vertices V1' and V2' shown in FIG. 9. Specifically, the y-coordinate value and z-coordinate value (y', z') of a vertex V' after displacement are calculated based on the y-coordinate value and z-coordinate value (y, z) of a vertex V before displacement, using expressions 1-5. Note that the x-coordinate value of each vertex remains unchanged.

$$rad = \theta \times (z/L) \quad (1)$$

$$temp\_y = y + R \quad (2)$$

$$y\_t = temp\_y \times \cos(rad) \quad (3)$$

$$y' = y\_t - R \quad (4)$$

$$z' = temp\_y \times \sin(rad) \quad (5)$$

Here, $\theta$ represents the central angle of an arc that is determined based on the height of the virtual camera VC. R represents the radius of the arc (cylinder). Because the distance L in the z-axis direction has a fixed value and $\theta$ is determined based on the height of the virtual camera VC, R is determined based on L and $\theta$ (R$\theta$=L).

All the vertices of the ground object 30 and the objects on the ground object 30 are subjected to the coordinate conversion based on expressions 1-5. Specifically, each vertex is subjected to the coordinate conversion based on expressions 1-5, which depends on the position of the vertex in the z-axis direction. In other words, each vertex is subjected to the coordinate conversion based on expressions 1-5, which depends on the position of the vertex in the depth direction along the ground object 30.

As shown in FIG. 9, for example, the vertex V1 on the ground object 30 is displaced to a position on the arc having a radius of R and a central angle of $\theta$. By performing similar coordinate conversion on all vertices on the ground object 30, the ground object 30 is deformed so as to form a portion of the side surface of a cylinder having a radius of R. The vertex V2 of the house object 35 on the ground object 30 is subjected to similar coordinate conversion to be displaced to a position shown in FIG. 9. By performing similar coordinate conversion on all vertices of the house object 35, the house object 35 is disposed on the side surface of the cylinder.

In the drum deformation process, each vertex is displaced by the GPU 22 using the vertex shader function. Specifically, the GPU 22 performs the coordinate conversion based on expressions 1-5 according to an instruction from the CPU 21. Thereafter, the GPU 22 performs a rendering process based on the virtual camera VC, and causes the display 12 to display an image. Specifically, each time an image is displayed on the display 12 (for each frame), the vertices of the ground object 30 and the objects on the ground object 30 are displaced by the GPU 22 using the vertex shader function, so that the entire terrain is deformed.

Note that θ is determined by the line-of-sight direction of the virtual camera VC (the height of the virtual camera VC). For example, when the line-of-sight direction of the virtual camera VC is set to the first direction, θ is set to a first value. When the line-of-sight direction of the virtual camera VC is set to the second direction, θ is set to a second value greater than the first value. Specifically, when the line-of-sight direction of the virtual camera VC is set to the second direction pointing further downward than the first direction, θ is set to a greater value. In other words, when the line-of-sight direction of the virtual camera VC is the second direction pointing further downward than the first direction, the resultant deformed ground has a greater curvature.

Meanwhile, when the line-of-sight direction of the virtual camera VC is set to the third direction pointing further downward than the second direction, the value of θ is set to a third value smaller than the first and second values. In other words, when the line-of-sight direction of the virtual camera VC is the third direction pointing further downward than the second direction, the resultant deformed ground has a smaller curvature.

Note that when the virtual camera VC is located at a position (e.g., the direction in which the virtual space is viewed from directly above) higher than the "high" position of FIG. 8, the drum deformation process may not be performed. In other words, when the virtual camera VC is set at a position where the entire virtual space is viewed like looking at a map, the process of deforming the terrain and objects on the terrain into a drum shape may not be performed.

Method for Generating Grass Objects 32

Figure 10:
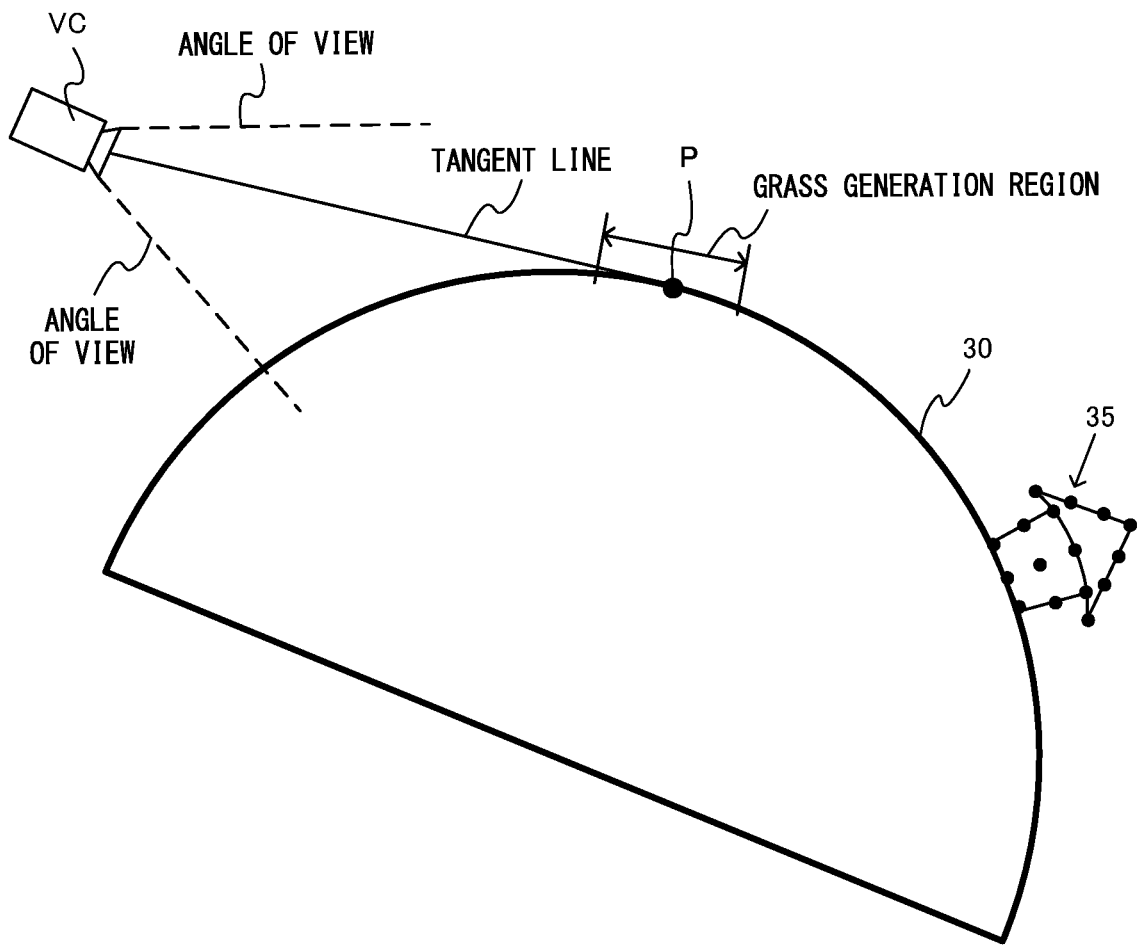
FIG. 10 is a diagram for describing a method for determining a grass generation region.
Figure 11:
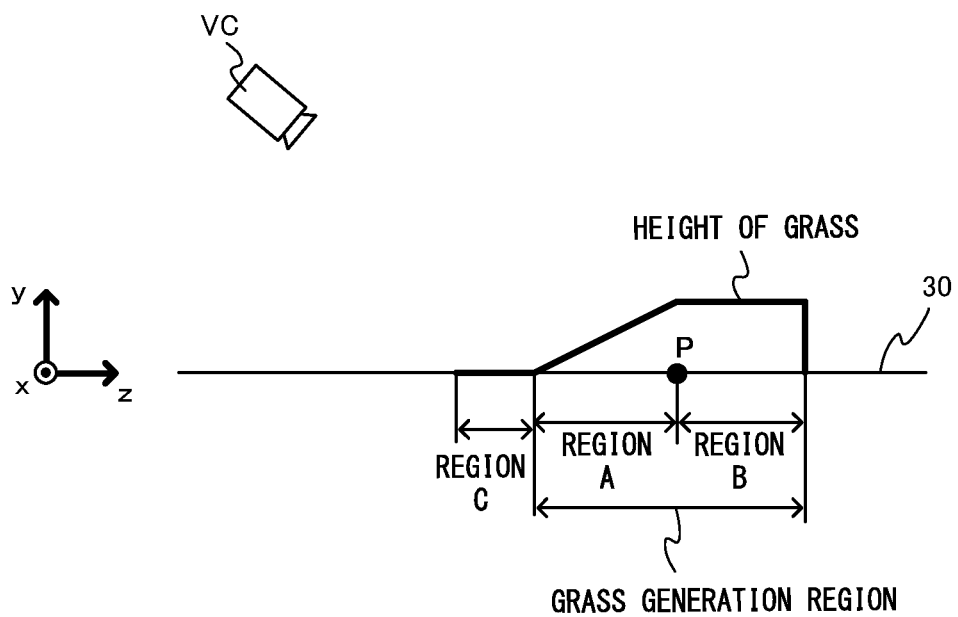
FIG. 11 is a diagram showing a non-limiting example height of a grass object 32.

FIG. 10 is a diagram for describing a method for determining a grass generation region. FIG. 11 is a diagram showing a non-limiting example height of the grass object 32.

As shown in FIG. 10, in determining a grass generation region, the CPU 21 calculates the tangent line from the position of the virtual camera VC to the ground object 30 after the drum deformation process. The point of tangency between the tangent line and the drum-shaped ground object 30 is indicated by P. A line determined based on the point P of tangency is a land horizon (a boundary line between the ground object 30 and the background) as viewed from the virtual camera VC. For example, a tangent line (perpendicular to the x-axis) may be drawn from the position of the virtual camera VC to the ground object 30, and a land horizon may be defined as a straight line that passes through the point P of tangency of the tangent line, extending in parallel to the x-axis. The CPU 21 determines, as a grass generation region, a predetermined region including a region that includes the point P of tangency (land horizon) and is closer to the virtual camera VC than the land horizon is, and a region that is further from the virtual camera VC than the point P of tangency is in the line-of-sight direction of the virtual camera VC (in a direction away from the virtual camera VC). Note that the grass generation region is determined before the drum deformation process is actually performed. Specifically, the CPU 21 calculates the tangent line that will be in contact with a cylindrical object when the drum deformation process has been performed on the flat ground object 30.

Note that when the virtual camera VC is located at some heights, the land horizon may not be included in the field of view of the virtual camera VC. In this case, a tangent line cannot be drawn, and therefore, a grass generation region is not present, and no grass objects 32 are generated. For example, when the virtual camera VC is located at the "high" position of FIG. 8, the land horizon is not be included in the field of view of the virtual camera VC, and therefore, no grass objects 32 are generated.

When the CPU 21 determines a grass generation region, the CPU 21 disposes a plurality of grass objects 32 in the grass generation region on the flat ground object 30, and determines the height of each grass object 32. As shown in FIG. 11, in a region A closer to the virtual camera VC than the point P of tangency (land horizon) is, the height of the grass object 32 varies depending on the distance from the virtual camera VC. Specifically, in the region A, the height of the grass object 32 is determined so as to decrease with a decrease in the distance from the virtual camera VC. Specifically, the height of the grass object 32 gradually becomes higher in the depth direction (the line-of-sight direction of the virtual camera VC) in a range from a position closer to the virtual camera VC than the point P of tangency is to the point P of tangency. The height of the grass object 32 is greatest at the point P of tangency (land horizon), and in a region B extending from the point P of tangency in the depth direction, the greatest height is maintained. Note that in a region C closer to the virtual camera VC than the region A is, grass objects 32 are disposed on the ground object 30, but the heights of the grass objects 32 are set to "0." Specifically, the three vertices of each grass object 32 are disposed on the ground object 30. Therefore, in the region C, it looks like there is no growth of the grass objects 32. In a region closer to the virtual camera VC than the region C is, no grass objects 32 are disposed (i.e., the three vertices are not disposed).

The peak vertex of a triangular grass object 32 is displaced by the GPU 22 using the vertex shader function, so that the grass object 32 is generated and displayed. Specifically, the height of the grass object 32 determined by the CPU 21 is input to the GPU 22, which in turn displaces the position of the peak vertex of the grass object 32 by coordinate conversion. As a result, the peak vertices of grass objects 32 are moved in the vertical direction, and therefore, it looks like grass objects 32 seamlessly appear.

After the peak vertices of grass objects 32 are displaced, a portion of the virtual space including the ground object 30 and objects (the grass objects 32, the house object, the tree object, the player character 40, etc.) disposed on the ground object 30, that is covered by at least the field of view of the virtual camera VC, is deformed by the drum deformation process. The drum deformation process is performed by the GPU 22 displacing the vertices of each object using the vertex shader function. Thereafter, the GPU 22 generates an image of the virtual space, which is displayed on the display 12 as shown in FIG. 5.

Figure 12:
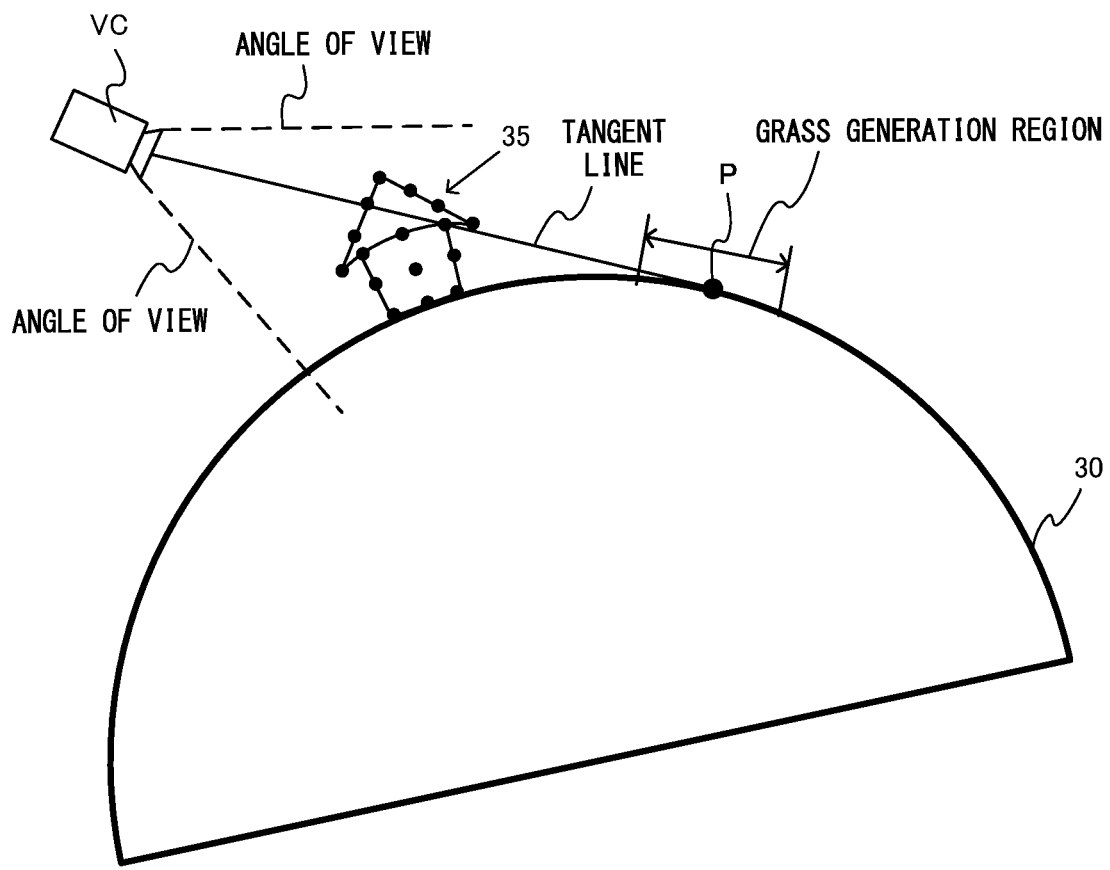
FIG. 12 is a diagram showing a non-limiting example in which a virtual camera VC has moved relative to a ground object 30 from the state of FIG. 10.

When the virtual camera VC moves from the state of FIG. 10 in the depth direction, the grass generation region also moves. FIG. 12 is a diagram showing a non-limiting example in which the virtual camera VC has moved relative to the ground object 30 from the state of FIG. 10.

For example, when the virtual camera VC moves from the state of FIG. 10 in the depth direction, the position of the point P of tangency on the ground object 30 moves. While in FIG. 10 the grass generation region is located closer to the virtual camera VC than the house object 35 is, in FIG. 12 the grass generation region is located beyond the house object 35. Thus, the grass generation region moves, depending on the movement of the virtual camera VC in the depth direction. When the virtual camera VC moves in the depth direction, the tangent line from the virtual camera VC to the cylindrical ground object 30 is calculated and the grass generation region is set in real time. As a result, grass objects 32 are generated or removed, depending on the movement of the virtual camera VC in the depth direction. In addition, the height of the grass object 32 is changed, depending on the movement of the virtual camera VC in the depth direction.

Note that the player character 40 and the virtual camera VC may be moved on the ground object 30 by moving the player character 40 and the virtual camera VC in the virtual space in the depth direction. Alternatively, the player character 40 and the virtual camera VC may be apparently moved in the depth direction by turning the entire drum-shaped terrain with the positions of the player character 40 and the virtual camera VC remaining unchanged. In other words, as long as the player character 40 and the virtual camera VC are controlled so that the player character 40 and the virtual camera VC move on the terrain, the player character 40 and the virtual camera VC may be moved in the virtual space, or the drum-shaped terrain may be turned with the positions in the virtual space of the player character 40 and the virtual camera VC fixed.

For example, the drum-shaped terrain may be turned by adding an angle corresponding to the amount of movement in the depth direction when the coordinate conversion described with reference to FIG. 9 is performed. Specifically, "rad" is calculated using the following expression 1' instead of expression 1.

$$\text{rad}=\theta \times ((z+\text{OFFSET})/L) \tag{1'}$$

Here, "OFFSET" is determined based on the movement in the depth direction of the player character 40. As shown in expression 1', "rad" is calculated based on a value obtained by adding the OFFSET value to z. Thereafter, "rad" calculated using expression 1' is substituted into expressions 2 and 5, so that the coordinate values of a converted vertex V are calculated. As a result, the entire terrain can be deformed into a drum shape, and the entirety of the drum-shaped terrain can be turned around the central axis of the drum, and therefore, apparent movement of the virtual camera VC can be achieved without actually moving the virtual camera VC in the virtual space. Specifically, by adding the OFFSET value to the z-coordinate value as in expression 1', it looks as if the virtual camera VC moved in the depth direction by the amount of "OFFSET."

As described above, in this embodiment, grass objects 32 are generated in a predetermined region that is located on the ground object 30 with reference to a boundary line (land horizon) between the ground object 30 and the background as viewed from the virtual camera VC. Therefore, the boundary line portion on the ground object 30 can be represented so as to look real. In addition, the player character 40 is located closer to the virtual camera VC than the predetermined region is, and moves and performs a predetermined action in a region where no grass objects 32 are generated. As a result, it can be reliably easy to see scenes that the player character 40 moves and performs a predetermined action on a predetermined item.

Grass objects 32 are generated so as to gradually become longer toward the boundary line from a region closer to the virtual camera VC than the boundary line is. Because longer grass objects 32 are formed on the boundary line of the ground object 30, the scene that grass objects 32 grow upward from the ground object 30 in the virtual space can be enhanced, resulting in an increase in reality.

In this embodiment, the ground object 30 is deformed along the circumferential direction of a cylinder as viewed from the virtual camera VC, and therefore, it can be easier to see the scene that grass objects 32 grow from the land horizon portion.

In this embodiment, the heights of grass objects 32 are adjusted by the GPU 22 using the vertex shader function in real time. As a result, it is not necessary to previously prepare grass objects 32 having different heights.

A grass object 32 can be moved by displacing a vertex of the grass object 32 using the vertex shader function of the GPU 22. For example, when the wind blows in the virtual space, the scene that grass objects 32 sway can be displayed by displacing the peak vertices of the grass objects 32 rightward and leftward. For example, in the case where a moving image recording the scene that grass objects 32 sway is displayed, the amount of data may be large, and the grass objects 32 may sway monotonously. In the case where vertices of grass objects 32 are displaced by the GPU 22 using the vertex shader function, it is not necessary to prepare such a moving image. In addition, for example, by providing a random displacement pattern, the swaying of grass objects 32 can be represented so as to look natural.

In this embodiment, the vertices of a flat terrain and objects on the terrain are displaced in real time by the GPU 22 using the vertex shader function. As a result, it is not necessary to previously prepare a curved terrain. In the case where a curved terrain is previously created, other objects (the house object 35 and the tree object 36) disposed on the terrain need to be created so as to fit the curved surface, and therefore, a game creator needs to spend a lot of time and effort. Specifically, when an object is disposed on a curved terrain, it is necessary to form the bottom surface of the object that is in contact with the ground, into a curved surface shape extending along the terrain, and it is also necessary to form the entire object into a shape that fits the bottom surface. In the case where different terrains having different curvatures are prepared, it is necessary to create objects for each curvature. However, in this embodiment, a flat terrain and objects disposed on the terrain are previously prepared, and the vertices of the flat terrain and the objects disposed on the terrain are displaced in real time by the GPU 22 using the vertex shader function. Therefore, it is not necessary to previously prepare a curved terrain or an object that fits the curved terrain. Therefore, game development efficiency can be improved.

In this embodiment, in the drum deformation process, the curvature of the drum is decreased ($\theta$ is decreased) when the line-of-sight direction of the virtual camera VC is the first direction, and the curvature of the drum is increased ($\theta$ is increased) when the line-of-sight direction of the virtual camera VC is the second direction pointing further downward than the first direction. As a result, an image that is easy to see for the user can be provided. For example, far locations in the depth direction are not displayed, due to the curved ground, and therefore, a region near the player character 40 can be more easily seen by the user, and therefore, the game can be made more enjoyable. When the line-of-sight direction of the virtual camera VC is the first direction (lateral direction), the curvature is small, and therefore, even when the entire terrain is deformed into a drum shape, an image that is natural to the user can be provided. For example, if the curvature is extremely great, the entire terrain looks greatly curved, so that an image that is unnatural to the user is likely to be displayed. However, in this embodiment, when the line-of-sight direction of the virtual camera VC is the first direction (lateral direction), the curvature of the drum is set to a small value, and therefore, such an unnatural feeling is less likely to occur.

Details of Game Process

Next, a non-limiting example game process that is performed in the body apparatus 2 will be specifically described. Firstly, data that is stored in the body apparatus 2 will be described.

Figure 13:
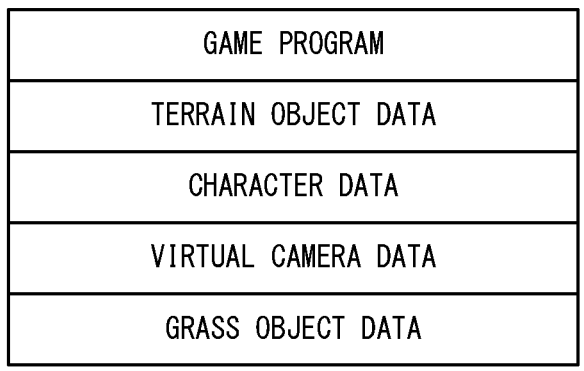
FIG. 13 is a diagram showing non-limiting example data stored in a body apparatus 2 (DRAM 26 thereof)

FIG. 13 is a diagram showing non-limiting example data stored in the body apparatus 2 (the DRAM 26 thereof). As shown in FIG. 13, the body apparatus 2 stores a game program, terrain object data, character data, virtual camera data, and grass object data. In addition to these kinds of data, the body apparatus 2 stores various kinds of data such as operation data corresponding to the user's operation, and other data of items, etc., used in a game.

The game program is for executing a game of this embodiment. The game program is, for example, stored in an external storage medium, and loaded from the external storage medium to the DRAM 26 during the start of the game.

The terrain object data is related to an object representing a terrain in the virtual space. The terrain object data contains the flat ground object 30, the flat river object 31, on which no grass objects 32 are generated, etc. The terrain object data also contains data that is related to the grassland object 30a, on which grass objects 32 can be generated, and the road object 30b, on which no grass objects 32 are generated. Data related to the ground object 30 contains a plurality of vertices.

The object data indicates other kinds of objects (the house object 35, the tree object 36, the cliff object 37, etc.) disposed on a terrain. Each piece of object data contains a plurality of vertices. A piece of object data contains, as data indicating each vertex, data indicating a position relative to a representative vertex. When an object (e.g., the house object 35) is disposed in the virtual space, the coordinate values in the virtual space of each vertex of the object are determined based on data indicating the relative position thereof. The object data is, for example, stored in an external storage medium, and loaded from the external storage medium to the DRAM 26 during the start of the game.

The character data contains data indicating the player character 40 disposed on a terrain. The data indicating the player character 40 contains a plurality of vertices, and as data indicating each vertex, data indicating a position relative to a representative vertex. Note that the character data may contain data indicating a character that is controlled by the CPU 21 (so-called CPU character).

The virtual camera data, which is related to a state of the virtual camera VC, indicates the position in the virtual space, line-of-sight direction, etc., of the virtual camera VC.

The grass object data is related to each grass object 32. The data related to each grass object 32 contains data indicating the position of the grass object 32 and data indicating the height of the grass object 32.

Figure 14:
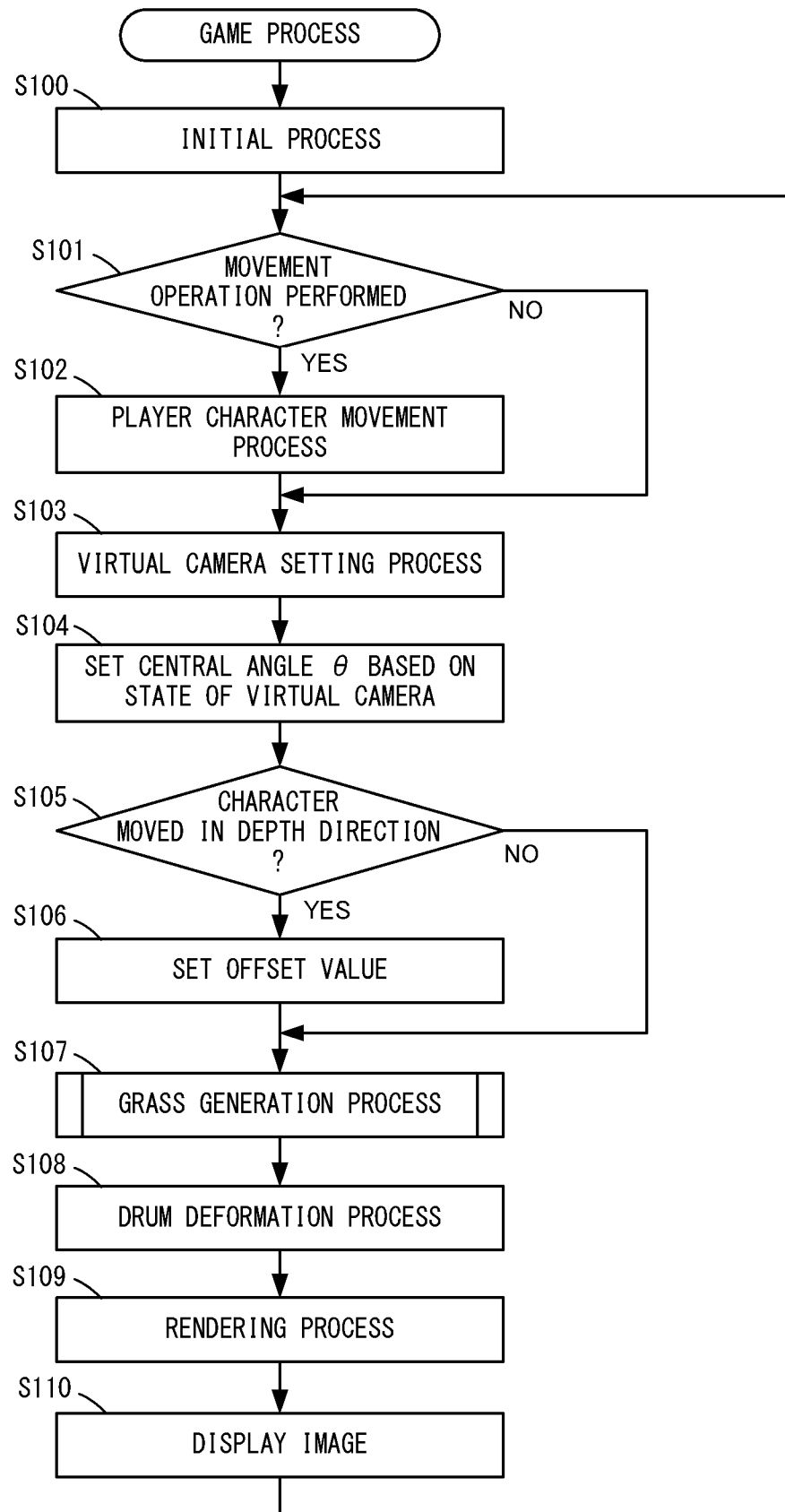
FIG. 14 is a flowchart showing a non-limiting example game process performed in a processor 20 of the body apparatus 2.

Next, a game process performed in the body apparatus 2 will be described in detail. FIG. 14 is a flowchart showing a non-limiting example game process performed in the processor 20 of the body apparatus 2. The process of FIG. 14 is performed by the CPU 21 or the GPU 22 of the body apparatus 2 executing a game program. Note that FIG. 14 shows only processes related to the generation of grass objects 32 and the drum deformation process, and does not show the other processes (e.g., the process of causing the player character 40 to perform a predetermined action, etc.).

As shown in FIG. 14, the CPU 21 performs an initial process (step S100). In the initial process, a fixed xyz-coordinate system is set in the virtual space, and each object is disposed in the virtual space. As a result, a terrain including a flat ground object, a river object, etc., is formed in the virtual space, and other objects (the house object 35, the tree object 36, the player character 40, etc.) are disposed on the terrain. When the position in the virtual space of each object is determined, the positions in the virtual space of the vertices of each object are determined. In addition, the virtual camera VC is disposed in the virtual space.

After step S100, the CPU 21 executes step S101. Thereafter, the CPU 21 executes steps S101-S110 repeatedly, i.e. at predetermined frame time intervals (e.g., ¹⁄₆₀ sec).

In step S101, the CPU 21 obtains operation data from a controller (the left controller 3 or the right controller 4), and based on the operation data, determines whether or not an operation of moving the player character 40 has been performed (step S101).

If it is determined that an operation of moving the player character 40 has been performed (step S101: YES), the CPU 21 performs a process of moving the player character 40 (step S102). For example, when the user inputs an instruction to move in the depth direction (z-axis direction), the CPU 21 moves the player character 40 in the depth direction.

If step S102 has been executed or if the determination result of step S101 is negative (NO), the CPU 21 performs a virtual camera setting process (step S103). Specifically, the CPU 21 sets the height (line-of-sight direction) of the virtual camera VC according to the user's operation. When the user changes the height of the virtual camera VC, the CPU 21 sets the height (position and line-of-sight direction) of the virtual camera VC.

Following step S103, the CPU 21 sets the central angle θ, depending on the state of the virtual camera VC (step S104). Specifically, the CPU 21 sets the central angle θ based on the line-of-sight direction (height) of the virtual camera VC set in step S103.

Next, the CPU 21 determines whether or not the player character 40 has moved in the depth direction (z-axis direction) according to the user's operation (step S105).

If it is determined that the player character 40 has moved in the depth direction (step S105: YES), the CPU 21 sets an offset value (step S106). The offset value set in this case is the "OFFSET" of expression 1'. Specifically, the CPU 21 sets the offset value based on the movement of the player character 40 in the z-axis direction. For example, the CPU 21 sets a negative offset value if the player character 40 has moved in the positive z-axis direction, and a positive offset value if the player character 40 has moved in the negative z-axis direction.

If step S106 has been executed or if the determination result of step S105 is negative (NO), the CPU 21 performs a grass generation process (step S107). The grass generation process of step S107 will now be described in detail.

Figure 15:
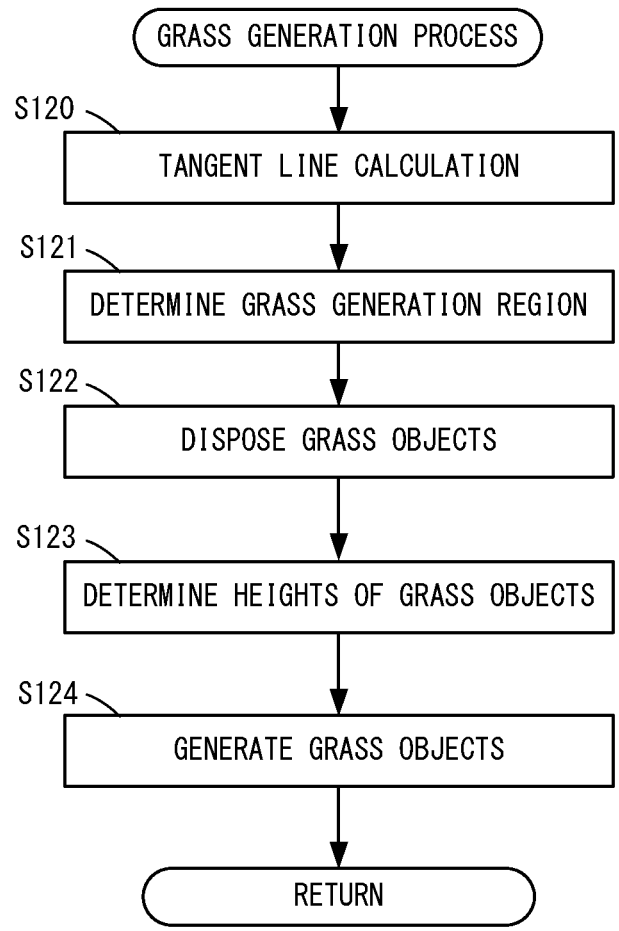
FIG. 15 is a flowchart showing a non-limiting example of a grass generation process of step S107.

FIG. 15 is a flowchart showing a non-limiting example of the grass generation process of step S107.

Initially, the CPU 21 calculates the tangent line from the position of the virtual camera VC to the ground object 30 deformed in a drum shape, in the field of view of the virtual camera VC (step S120).

Next, the CPU 21 determines a grass generation region (step S121). Specifically, the CPU 21 determines, as a grass generation region, a predetermined region on the ground object 30 that includes the point P of tangency (a region including a region closer to the virtual camera VC than the point P of tangency is and a region further or deeper from the virtual camera VC than the point P of tangency is).

Next, the CPU 21 disposes a plurality of grass objects 32 in the determined grass generation region (step S122). For example, the CPU 21 may dispose a plurality of grass objects 32 in the grass generation region so that the grass objects 32 are equally spaced. Here, a plurality of grass objects 32 are disposed in the grass generation region of the flat ground object 30. Note that the CPU 21 does not dispose a grass object 32 in a region of the grass generation region determined in step S121 that no grass objects are not allowed to be generated (e.g., the region of the road object 30*b*).

Following step S122, the CPU 21 determines the height of each grass object 32 (step S123). The method for determining the height of the grass object 32 is as described above with reference to FIG. 11.

Next, the CPU 21 generates grass objects 32 in the grass generation region (step S124). Specifically, the CPU 21 transmits an instruction to the GPU 22 to displace the peak vertex of each grass object 32, depending on the determined height of the grass object 32. The GPU 22 performs coordinate conversion on the peak vertices of the grass objects 32 using the vertex shader function according to the instruction, to displace the peak vertex of each grass object 32. As a result, the grass objects 32 are generated on the ground object 30 in the grass generation region.

After execution of step S124, the CPU 21 returns to the process of FIG. 14.

Referring back to FIG. 14, following step S107, the CPU 21 causes the GPU 22 to execute the drum deformation process of deforming the terrain and each object on the terrain (step S108). The GPU 22 displaces the vertices of the terrain object 30 and each object (the grass objects 32, the house object 35, the tree object 36, the player character 40, etc.) on the terrain object 30, using the vertex shader function. By performing the drum deformation process, the flat ground is deformed to form a portion of the side surface of a cylinder, and the objects on the ground are also deformed to fit the side surface of the cylinder. Note that if the offset value has been set in step S106, the displacement of the vertices is calculated using expression 1'.

Thereafter, the CPU 21 causes the GPU 22 to perform a rendering process based on the virtual camera VC (step S109). As a result, an image of the terrain and the objects on the terrain that have been deformed by the drum deformation process, as viewed from the virtual camera VC, is generated. The generated image is output to the display 12, on which the image of the virtual space is displayed (step S110).

Note that the drum deformation process of step S108 are performed only on vertices included in the field of view (image capture range) of the virtual camera VC. In other words, the drum deformation process is not performed on vertices that are not included in the field of view of the virtual camera VC.

If step S110 has been performed, the CPU 21 executes step S101 again. Thus, FIG. 14 has been described.

Thus, the grass generation process of step S107 and the drum deformation process of step S108 are executed repeatedly, i.e. at frame time intervals. Even when the player character 40 moves in the z-axis direction, so that the position on the ground object 30 of the land horizon is changed, the grass generation process is performed in real time.

As described above, in this embodiment, the tangent line from the virtual camera VC to the ground object 30 deformed in a drum shape is calculated, and based on the point P of tangency, a grass generation region is determined. Thereafter, a plurality of grass objects 32 are disposed in the grass generation region, the heights of the grass objects 32 are determined, and the vertices of the grass object 32 are displaced, whereby the grass objects 32 are generated. Thus, the grass objects 32 are generated in a predetermined region that is located with reference to a boundary line between the ground object 30 and the background as viewed from the virtual camera VC. As a result, the ground surface can be represented so as to look real.

Variations

In the foregoing, the image processing of this embodiment has been described. The above embodiment is merely for illustrative purposes. The following variations may be additionally provided, for example.

For example, although in the above embodiment, the grass objects 32 are generated on the grassland object 30*a*, grass objects are not the only objects that are generated. For example, in a game scene that snow lies, a snow object having a height may be generated in a predetermined region located with reference to the boundary line between the ground object 30 and the background. A snow object may be formed of a single triangular polygon like a grass object, or may be a combination of a plurality of triangles. A height of a snow object (a height of accumulated snow) may be greatest at the boundary line like the grass object 32, and may gradually become smaller toward the virtual camera VC in a region closer to the virtual camera VC than the boundary line is. In this case, there may be a region where a snow object is disposed (e.g., the region of the grassland object 30*a*) and a region where no snow object is disposed (e.g., the region of the road object 30*b*).

In addition to or instead of a grass object and a snow object, any suitable predetermined object having a height may be generated in the predetermined region.

In the above embodiment, grass objects 32 are generated in the predetermined region located with reference to the land horizon. The predetermined region located with reference to the land horizon may be either a region that includes the land horizon or a region that does not include the land horizon (e.g., a region closer to the virtual camera VC than the land horizon is).

In the above embodiment, objects are generated in a predetermined region located with reference to the land horizon that is a boundary line between the ground object 30 and the background as viewed from the virtual camera VC. In another embodiment, a predetermined object having a height is generated in a predetermined region located with reference to a boundary line between any suitable terrain object and the background as viewed from the virtual camera VC. For example, a predetermined object may be generated in a predetermined region located with reference to a sea horizon that is a boundary line between a terrain object representing a sea, lake, or river and the background. For example, a scene that the sea horizontal portion undulates may be represented by generating wave object having a predetermined height as the predetermined object in a predetermined region located with reference to the sea horizon. In addition to or instead of a flat ground, a mountain or heel object having a height may be disposed in the virtual space, and a predetermined object may be generated in a predetermined region located with reference to a boundary line between the mountain or heel object and the background (a boundary line as viewed from the virtual camera VC).

Specifically, a terrain object representing any terrain (e.g., a ground object, a sea or river object, a mountain object, etc.) may be disposed in the virtual space, and a predetermined object may be disposed in a predetermined region located with reference to a boundary line (also referred to as a "ridge line") between the terrain object and the background. As used herein, the boundary line (ridge line) refers to a boundary between a terrain object and the background as viewed from the virtual camera VC, such as a land horizon, a sea horizon, and a contour of a mountain when the mountain is viewed in front of the background.

In the above embodiment, the ground object 30 is assumed to have a drum shape (the side surface of a cylinder). In another embodiment, the terrain object may have a spherical shape or any other suitable curved shape.

Although in the above embodiment, the drum deformation process of deforming the ground object 30 into a drum shape is performed, the drum deformation process may not necessarily be performed. Specifically, when a flat terrain is displayed, a predetermined object may be generated in a predetermined region located with reference to a boundary line between the flat terrain and the background.

In the above embodiment, in the drum deformation process, coordinate conversion is performed on each vertex by the GPU 22 using the vertex shader function. In another embodiment, coordinate conversion may be performed on each vertex by the CPU 21.

The process of the above flowchart is merely for illustrative purposes. The order and details of the steps may be changed as appropriate.

The above game is merely for illustrative purposes. The above-described process may be performed in any other suitable games.

In the above embodiment, it is assumed that the above process is performed in the body apparatus 2 of the game system 1. Alternatively, the above process may be performed in any other suitable image processing apparatuses (e.g., a personal computer, smartphone, and tablet terminal), etc. In still another embodiment, the above process may be performed in an image processing system including a plurality of apparatuses (e.g., a system including a terminal and a server).

In the foregoing, this embodiment has been described. The above description is merely an illustration of this embodiment, and various modifications and changes may be made thereto.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein an image processing program for causing a computer of an information processing apparatus to execute:
   controlling a virtual camera in a virtual space including terrain;
   modeling at least one three-dimensional object as a collection of polygons having peak vertices, in a range located with reference to a horizon at an intersection between the terrain and a background as viewed from the virtual camera;
   moving the virtual camera or the terrain so that a relative positional relationship between the virtual camera and the terrain changes;
   when a first area on the terrain that is not included in the range before the movement is included in the range due to the movement, transforming together coordinates of the peak vertices of the collection of polygons in the first area based on the relative positional relationship between the virtual camera and the terrain to cause the at least one three-dimensional object to appear in the first area; and
   generating, for display on a display device, an image of the virtual space based on the virtual camera.

2. The non-transitory computer-readable storage medium according to claim 1, wherein
   the terrain is in the shape of at least a portion of the side surface of a cylinder or at least a portion of a spherical surface.

3. The non-transitory computer-readable storage medium according to claim 1, wherein the terrain is flat, and
   the image processing program causes the computer to further execute:
      deforming at least the range of the flat terrain corresponding a field of view of the virtual camera, to generate the terrain having a curved surface shape.

4. The non-transitory computer-readable storage medium according to claim 3, wherein
   the horizon comprises a horizon at which the terrain and sky intersect, that is determined based on a point of tangency of a tangent line from the virtual camera to the curved surface.

5. The non-transitory computer-readable storage medium according to claim 3, wherein
   the computer includes a graphics processor having a vertex shader function, and
   the deformation of the terrain and generation of the at least one three-dimensional object are performed by coordinate conversion using the vertex shader function.

6. The non-transitory computer-readable storage medium according to claim 5, wherein
   the at least one three-dimensional object includes a grassy region comprising grass blade objects modeled with the polygons, and on a portion of the terrain on which generation of the grassy region is allowed, the grassy region is generated by coordinate conversion of peak vertices of the polygons so that grass blade objects located closer to the virtual camera in the range have a shorter length than grass blade objects located further away from the virtual camera in the range.

7. The non-transitory computer-readable storage medium according to claim 5, wherein
   the object includes a snowy region modeled with the polygons, and on a portion of the terrain on which generation of the snowy region is allowed, the snowy region is generated by coordinate conversion of a vertices of the polygons modeling the snowy region so that polygons modeling the snowy region located closer to the virtual camera in the range have a smaller height than polygons modeling the snowy region located further away from the virtual camera in the range.

8. The non-transitory computer-readable storage medium according to claim 1, wherein
   the horizon comprises a horizon at which the terrain and sky intersect, that is determined based on a positional relationship between the virtual camera and the terrain.

9. The non-transitory computer-readable storage medium according to claim 1, wherein
   the at least one three-dimensional object has a height, and
   the at least one three-dimensional object is generated so that the height of the at least one three-dimensional object varies depending on a distance thereof from the virtual camera.

10. The non-transitory computer-readable storage medium according to claim 1, wherein
the image processing program causes the computer to further execute:
moving a player character on the terrain according to an operation input, and
a position of the virtual camera is controlled based on a position of the player character so that the player character is located in front of the virtual camera in a line-of-sight direction of the virtual camera, and the horizon is located further from the virtual camera than the player character is in the line-of-sight direction of the virtual camera.

11. The non-transitory computer-readable storage medium according to claim 10, wherein
the image processing program causes the computer to further execute:
disposing an item object on the terrain; and
causing the player character to perform an action on the item object, according to the operation input.

12. The non-transitory computer-readable storage medium according to claim 1, wherein
the image processing program causes the computer to further execute:
moving a player character on the terrain that is flat, in the virtual space, according to an operation input;
controlling a position of the virtual camera based on a position of the player character;
generating the at least one three-dimensional object at a position corresponding to the range on the flat terrain based on the position of the virtual camera; and
displacing vertices of the terrain, the at least one three-dimensional object, and the player character that are included in at least a field of view of the virtual camera so that the flat terrain is deformed into a curved surface.

13. The non-transitory computer-readable storage medium according to claim 1, further including generating a terrain object which shares vertices with at least one other terrain object and is a part of the terrain.

14. An image processing system comprising at least one processor, wherein the at least one processor executes:
controlling a virtual camera in a virtual space including terrain;
modeling at least one three-dimensional object as a collection of polygons having peak vertices, in a range located with reference to a horizon at an intersection between the terrain and a background as viewed from the virtual camera;
generating an image of the virtual space, based on the virtual camera;
moving the virtual camera or the terrain so that a relative positional relationship between the virtual camera and the terrain changes;
when a first area on the terrain that is not included in the range before the movement is included in the range due to the movement, transforming coordinates of the peak vertices of the collection of polygons together in the first area based on the relative positional relationship between the virtual camera and the terrain to cause the at least one three-dimensional object to appear in the first area; and
causing a display device to display the image of the virtual space.

15. The image processing system according to claim 14, wherein
the terrain is in the shape of at least a portion of the side surface of a cylinder or at least a portion of a spherical surface.

16. The image processing system according to claim 14, wherein
the at least one processor further executes:
deforming at least a range of a flat terrain corresponding a field of view of the virtual camera, to generate the terrain having a curved surface shape.

17. The image processing system according to claim 16, wherein
the horizon comprises a horizon representing intersection between the terrain and sky, that is determined based on a point of tangency of a tangent line from the virtual camera to the curved surface.

18. The image processing system according to claim 16, wherein
the at least one processor includes a graphics processor having a vertex shader function, and
the deformation of the terrain and generation of the at least one three-dimensional object are performed by coordinate conversion using the vertex shader function.

19. The image processing system according to claim 18, wherein
the at least one three-dimensional object includes a grassy region comprises grass blade objects modeled as polygons, and on a portion of the terrain on which generation of the grassy region is allowed, the grassy region is generated by coordinate conversion of peak vertices of the polygons so that grass blade objects located closer to the virtual camera in the range have a shorter length than grass blade objects located further away from the virtual camera in the range.

20. The image processing system according to claim 18, wherein
the at least one three-dimensional object includes a snowy region modeled as polygons, and on a portion of the terrain on which generation of the snowy region is allowed, the snowy region is generated by coordinate conversion of peak vertices of the polygons modeling the snowy region so that the polygons modeling the snowy region that are located closer to the virtual camera in the range have a smaller height than the polygons modeling the snowy region that are located further away from the virtual camera in the range.

21. The image processing system according to claim 14, wherein
the horizon comprises a horizon that is determined based on a positional relationship between the virtual camera and the terrain.

22. The image processing system according to claim 14, wherein
the at least one three-dimensional object has a height, and
the at least one three-dimensional object is generated so that the height of the at least one three-dimensional object varies depending on a distance thereof from the virtual camera.

23. The image processing system according to claim 14, wherein
the at least one processor further executes:
moving a player character on the terrain according to an operation input, and
a position of the virtual camera is controlled based on a position of the player character so that the player character is located in front of the virtual camera in a line-of-sight direction of the virtual camera, and the horizon is located further from the virtual camera than the player character is in the line-of-sight direction of the virtual camera.

24. The image processing system according to claim 23, wherein
the at least one processor further executes:
disposing an item object on the terrain; and
causing the player character to perform an action on the item object, according to the operation input.

25. The image processing system according to claim 14, wherein
the at least one processor further executes:
moving a player character on the terrain that is flat, in the virtual space, according to an operation input;
controlling a position of the virtual camera based on a position of the player character;
generating the at least one three-dimensional object at a position corresponding to the range on the flat terrain based on the position of the virtual camera; and
displacing vertices of the terrain, the polygons modeling the at least one three-dimensional object, and the player character that are included in at least a field of view of the virtual camera so that the flat terrain is deformed into a curved surface.

26. An image processing apparatus for executing:
controlling a virtual camera in a virtual space including terrain;
modeling at least one three-dimensional object as a collection of polygons having peak vertices, in a range located with reference to a horizon at an intersection between the terrain and a background as viewed from the virtual camera;
generating an image of the virtual space, based on the virtual camera;
moving the virtual camera or the terrain so that a relative positional relationship between the virtual camera and the terrain changes;
when a first area on the terrain that is not included in the range before the movement is included in the range due to the movement, transforming together coordinates of the peak vertices of the collection of polygons in the first area based on the relative positional relationship between the virtual camera and the terrain to cause the at least one three-dimensional object to appear in the first area; and
causing a display device to display the generated image of the virtual space.

27. The image processing apparatus according to claim 26, further executing:
moving a player character on the terrain that is flat, in the virtual space, according to an operation input;
controlling a position of the virtual camera based on a position of the player character;
generating the at least one three-dimensional object at a position corresponding to the range on the flat terrain based on the position of the virtual camera; and
displacing vertices of the terrain, the polygons modeling the at least one three-dimensional object, and the player character that are included in at least a field of view of the virtual camera so that the flat terrain is deformed into a curved surface.

28. An image processing method to be executed by an image processing system, the method causing the system to execute:
controlling a virtual camera in a virtual space including terrain;
modeling at least one three-dimensional object as a collection of polygons having peak vertices, in a range located with reference to a horizon at an intersection between the terrain and a background as viewed from the virtual camera;
moving the virtual camera or the terrain so that a relative positional relationship between the virtual camera and the terrain changes;
when a first area on the terrain that is not included in the range before the movement is included in the range due to the movement, transforming together coordinates of the peak vertices of the collection of polygons in the first area based on the relative positional relationship between the virtual camera and the terrain to cause the at least one three-dimensional object to appear in the first area; and
generating an image of the virtual space, based on the virtual camera, the image being to be displayed on a display device.

29. The image processing method according to claim 28, wherein
the method causes the system to further execute:
moving a player character on the terrain that is flat, in the virtual space, according to an operation input;
controlling a position of the virtual camera based on a position of the player character;
generating the at least one three-dimensional object at a position corresponding to the range on the flat terrain based on the position of the virtual camera; and
displacing vertices of the terrain, the polygons modeling the at least one three-dimensional object, and the player character that are included in at least a field of view of the virtual camera so that the flat terrain is deformed into a curved surface.

* * * * *